(12) United States Patent
Wong et al.

(10) Patent No.: US 8,655,399 B2
(45) Date of Patent: Feb. 18, 2014

(54) DETERMINING A MAXIMUM SIR TARGET FOR POWER CONTROL IN A CELLULAR NETWORK

(75) Inventors: Edas Wong, Kista (SE); Billy Hogan, Sollentuna (SE); Par Ankel, Nodinge (SE); Andreas Andersson, Landvetter (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 235 days.

(21) Appl. No.: 13/123,751

(22) PCT Filed: Apr. 16, 2010

(86) PCT No.: PCT/SE2010/050410
§ 371 (c)(1),
(2), (4) Date: Aug. 22, 2011

(87) PCT Pub. No.: WO2011/129730
PCT Pub. Date: Oct. 20, 2011

(65) Prior Publication Data
US 2011/0294533 A1    Dec. 1, 2011

(51) Int. Cl.
*H04W 52/10*    (2009.01)
*H04W 52/24*    (2009.01)

(52) U.S. Cl.
USPC .......................................................... 455/522

(58) Field of Classification Search
None
See application file for complete search history.

(56) References Cited

U.S. PATENT DOCUMENTS

| 2003/0036403 A1 | 2/2003 | Shiu et al. |
| 2004/0259559 A1 | 12/2004 | Li et al. |
| 2008/0123520 A1* | 5/2008 | Ji et al. ......................... 370/216 |
| 2010/0265927 A1* | 10/2010 | Shearer et al. ................ 370/338 |

FOREIGN PATENT DOCUMENTS

EP    1890407 A2    2/2008

* cited by examiner

*Primary Examiner* — Philip Sobutka
(74) *Attorney, Agent, or Firm* — Coats & Bennett, PLLC

(57) ABSTRACT

It is presented a power controller which is adapted to be coupled to a fixed node of a cellular network, wherein at least one user equipment is adapted to be associated with the fixed node. The power controller comprises: a signal to interference ratio, SIR, determiner arranged to determine a maximum SIR target for each of the at least one user equipment, which maximum SIR target is arranged to limit maximum transmission power of the at least one user equipment; wherein the determiner determines a maximum SIR target for each of the at least one user equipment directly or indirectly based on the number of user equipments in the cell of each respective user equipment. A corresponding method, computer program and computer program product are also presented.

24 Claims, 6 Drawing Sheets

| 38<br>TTI<br>[ms] | 40<br>Granted<br>rate [kbps] | 42<br>Max SIR<br>[dB] |
|---|---|---|
| 2 | 160 | 6 |
| 2 | 320 | 6 |
| ... | ... | ... |
| 2 | 5440 | 12 |
| ... | ... | ... |

| 44<br># m.s. | 46<br>Max SIR |
|---|---|
| 1 | 3 |
| 2 | 3 |
| 3 | 3 |
| ⋮ | |
| x | 10 |
| | |

DETERMINING A MAXIMUM SIR TARGET FOR POWER CONTROL IN A CELLULAR NETWORK

TECHNICAL FIELD

The invention relates generally to cellular communication networks, and more particularly to power control in cellular networks.

BACKGROUND

In cellular networks, such as networks complying to the UMTS (Universal Mobile Telecommunications System) standard, more and more traffic is due to data traffic.

Using EUL (enhanced uplink), capacity has been increased and delay is reduced. However, capacity is always short and there is a perpetual need to increase capacity.

HARQ (hybrid automatic repeat request) re-transmissions can be exploited to increase the cell and user capacity.

A higher percentage of HARQ re-transmissions can lower the air-interface load for a given user throughput. This can be achieved by setting a required percentage of BLER (block error rate) in HARQ transmission to a given target number of HARQ re-transmissions in outer-loop power control in the RNC (radio network controller).

In the prior art, outer loop power control is typically a task of the RNC, since it controls the SIR target in more than one RBS (radio base station) when a user is in soft handover. The RNC can also set a maximum SIR target for a given radio access bearer. The inner loop power control is performed at the RBS to control the power of each of its instances of user equipment. One task in the inner loop power control is to measure the SIR for each user equipment at the RBS and control the transmission power of the respective instances of user equipment to reach the SIR target received from the outer loop control.

However, the RNC is not in control of the users rate, as the granted rate is handled in the scheduler in the RBS, whereby it can be difficult to optimize the correct target number of HARQ re-transmissions required for each granted rate.

For example, a low percentage of HARQ re-transmissions might be required when aiming to have a high peak rate, since a high percentage of HARQ re-transmissions will effectively lower the peak throughput. On the other hand, a high percentage of HARQ re-transmissions might be required when on a lower granted rate, for example when there are a number of EUL users in the cell, to increase cell capacity, and as a result the per-user throughput.

Another problem is when controlling the target number of HARQ re-transmissions and target BLER from the RNC, it is not prevented that two or more users affect each others SIR (signal to interference ratio) by causing each other to raise power, potentially causing more re-transmissions and causing outer-loop power control to raise the SIR target, and thus reduce cell capacity.

SUMMARY

An object of the invention is to provide a power controller, a method, a computer program and a computer program product to increase cell capacity for EUL throughput, while also allowing high peak rates.

It is presented a power controller which is adapted to be coupled to a fixed node of a cellular network, wherein at least one user equipment is adapted to be associated with the fixed node. The power controller comprises: a signal to interference ratio, SIR, determiner arranged to determine a maximum SIR target for each of the at least one user equipment, which maximum SIR target is arranged to limit maximum transmission power of the at least one user equipment; wherein the determiner is arranged to determine a maximum SIR target for each of the at least one user equipment directly or indirectly based on the number of user equipments in the cell of each respective user equipment.

The determiner may be arranged such that a reduction in a number of user equipments in the cell of each respective user equipment results in an increased maximum SIR target.

The determiner may be arranged to determine the maximum SIR target for each of the at least one user equipment based on a granted data rate for the respective user equipment.

The determiner may be arranged such that an increased data rate granted for the respective user equipment results in an increased maximum SIR target.

The determiner may be arranged to determine the maximum SIR target for each of the at least one user equipment based on a granted data rate and a transmission time interval for the respective user equipment.

The determiner may be arranged to determine the maximum SIR target using a lookup table.

The maximum SIR target may be controlled using a ramp function to be applied for the respective user equipment to shift to the determined maximum SIR target.

The determiner may be arranged to determine the maximum SIR target for each of the at least one user equipment as a minimum of a maximum SIR target received from a more central network node, and the maximum SIR target previously determined within the power controller.

The determiner may be arranged to determine the SIR for each of the at least one user equipment based on a number of instances of user equipment being active in the same cell as the respective user equipment.

The determiner may be arranged to determine the SIR for each of the at least one user equipment based on a number of instances of user equipment being active with enhanced uplink in the same cell as the respective user equipment.

The power controller may be arranged to limit the SIR only for best effort data transmission.

A second aspect of the invention is a base station comprising the power controller according to the first aspect.

A third aspect of the invention is a radio network controller arranged to manage a plurality of base stations, wherein the radio network controller comprises the power controller according to the first aspect.

A fourth aspect of the invention is a method for controlling power performed in a power controller adapted to be coupled to a fixed node of a cellular network, wherein at least one user equipment is adapted to be associated with the fixed node. The method comprises the steps of: determining a maximum signal to interference ratio, SIR, for each of the at least one user equipment directly or indirectly based on the number of user equipments in the cell of each respective user equipment), and sending a message comprising the maximum signal to interference ratio to each one of the at least one user equipment to thereby limits maximum transmission power of the at least one user equipment.

A fifth aspect of the invention is a computer program for a power controller which is adapted to be coupled to a fixed node of a cellular network, wherein at least one user equipment is adapted to be associated with the fixed node. The computer program comprises computer program code which, when run on the power controller, causes the power controller to perform the steps of: determining a maximum signal to interference ratio, SIR, for each of the at least one user equipment directly or indirectly based on the number of user equipments in the cell of each respective user equipment, and sending a message comprising the maximum signal to interference ratio to each one of the at least one user equipment to thereby limits maximum transmission power of the at least one user equipment.

A sixth aspect of the invention is a computer program product comprising a computer program according to the fifth aspect and a computer readable means on which the computer program is stored.

It is to be noted that, when applicable, any features of the first, second, third, fourth, fifth and sixth aspects can be applied to any other of these aspects.

It is to be noted that whenever the term user equipment is used in the claims and description, it is to be construed as a client in a cellular network.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
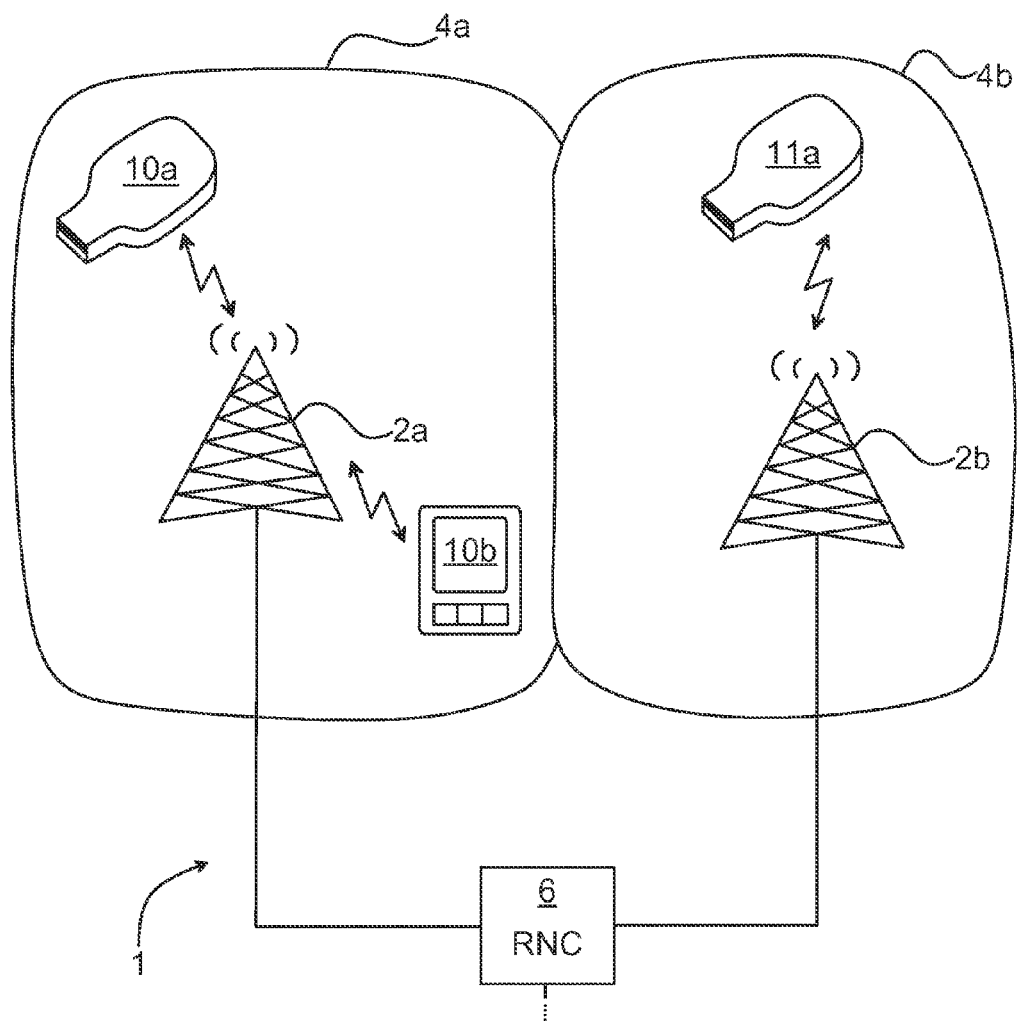
FIG. 1 is a schematic diagram illustrating an environment where embodiments as described herein can be applied.

FIG. 1 is a schematic diagram illustrating an environment where embodiments as described herein can be applied. A cellular network 1 comprises a radio network controller (RNC) 6 and two radio base stations 2a, 2b, responsible for respective radio cells 4a, 4b. In this example, a first base station 2a is connected via wireless communication to two instances of user equipment 10a, 10b. One user equipment 10a is in the form of a modem for a computer while the second user equipment 10b is in the form of a self contained mobile communication terminal. The second user equipment can optionally function as a modem to a computer, whereby it can perform the same functions as the first user equipment 10a. In this example, a second radio base station 2b is connected to a third user equipment 11a.

Only two radio base stations 2a, 2b are shown in this example for reasons of clarity. However, as the skilled person would realise, the cellular network 1 can include any suitable number of radio base stations. Furthermore, nodes and components of the cellular network 1 which are not needed to explain the concept of the embodiments herein are omitted for reasons of clarity.

The cellular network 1 can be any cellular network benefitting from the novel and inventive ideas presented herein. For example, the cellular network can comply to any of the following standards: UMTS (Universal Mobile Telecommunications System) and CDMA2000 (Code Division Multiple Access 2000).

Figure 2:
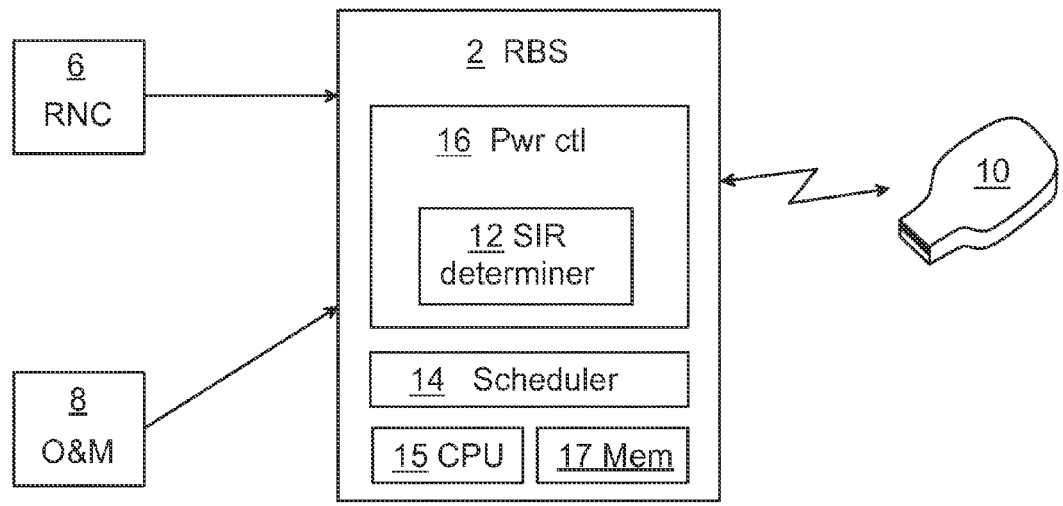
FIG. 2 is a schematic diagram illustrating an embodiment of a radio base station which can be part of FIG. 1.

It is to be noted that the term user equipment is to denote any client in a cellular network, including, but not limited to, mobile client, mobile communication terminal, mobile station FIG. 2 is a schematic diagram illustrating an embodiment of a radio base station 2 which can be part of FIG. 1. The radio base station 2 comprises a scheduler 14 and a power controller 16 which itself comprises a SIR determiner 12. The power controller 16, SIR determiner 12 and the scheduler 14 are modules which can be implemented using software and/or hardware. The scheduler 14 can implement the enhanced uplink scheduler functionality of the EUL standard.

A controller 15 is provided using any suitable central processing unit (CPU), microcontroller, digital signal processor (DSP), etc., capable of executing software instructions stored in a computer program product 17 e.g. in the form of a memory. The computer program product 17 can be a memory or any combination of read and write memory (RAM) and read only memory (ROM). The memory also comprises persistent storage, which, for example, can be any single one or combination of magnetic memory, optical memory, or solid state memory or even remotely mounted memory.

The radio base station 2 is connected to a radio network controller 6 and an operation and maintenance system 8. Furthermore, the radio base station 2 can be in wireless contact with one or more instances of user equipment 10. As will be explained in more detail below, the radio base station 2 can be configured to set a maximum SIR target based on the granted data rate in its cell. Optionally, the number of instances of user equipment can also affect the maximum SIR target.

Figure 3:
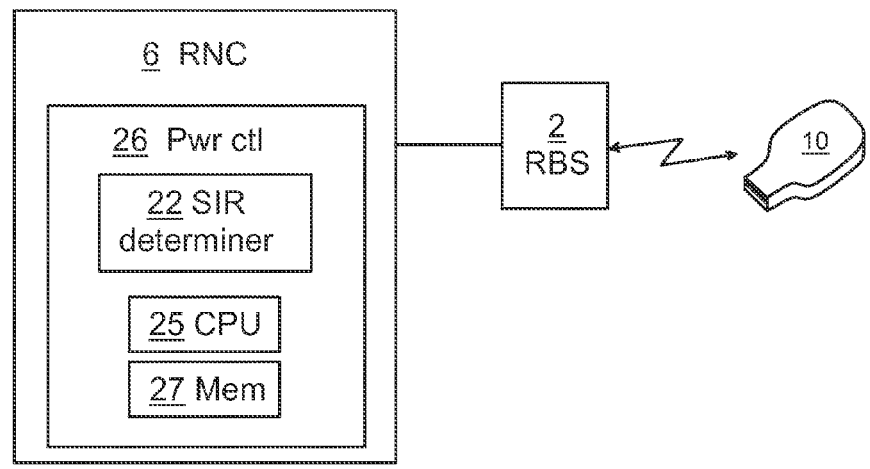
FIG. 3 is a schematic diagram illustrating an embodiment of a radio network controller which can be part of FIG. 1.

FIG. 3 is a schematic diagram illustrating an embodiment of a radio network controller 6 which can be part of FIG. 1. The radio network controller 6 comprises a power controller 26 which itself comprises a SIR determiner 22. The power controller 26 and the SIR determiner 22 are modules which can be implemented using software and/or hardware.

A controller 25 is provided using any suitable central processing unit (CPU), microcontroller, digital signal processor (DSP), etc., capable of executing software instructions stored in a computer program product 27 e.g. in the form of a memory. The computer program product 27 can be a memory or any combination of read and write memory (RAM) and read only memory (ROM). The memory also comprises persistent storage, which, for example, can be any single one or combination of magnetic memory, optical memory, or solid state memory or even remotely mounted memory.

The radio network controller 6 is connected to one or more radio base stations 2 which in turn are connected to one or more instances of user equipment 10. As will be explained in more detail below, the radio network controller 6 can set a maximum SIR target per cell based on the number of instances of user equipment can also affect the maximum SIR target.

Here now follows a general discussion of how cell capacity and SIR in embodiments herein.

In a cell, the capacity is dependent on a number of factors. One factor is HARQ re-transmissions. More HARQ re-transmissions lowers the air interface load for a given user throughput. However, more HARQ re-transmissions require more hardware usage, which is costly. Furthermore, a high percentage of HARQ re-transmissions will effectively lower the peak throughput, which is particularly unfavourable for high data rates. The EUL cell capacity is also dependent on the power transmitted by the instances of user equipment in the cell. The power is related to the uplink DPCCH (dedicated physical control channel) SIR target for the user equipment, and the power transmitted on the E-DPDCH (enhanced dedicated physical data channel) and the uplink control channels such as E-DPCCH (enhanced dedicated physical control channel), HS-DPCCH (high-speed dedicated physical control channel).

The SIR target of a user in the prior art is controlled by outer-loop power control (OLPC). OLPC is typically located in the RNC since the RNC controls the SIR target in more than one RBS when a user is in soft-handover. However, this is not theoretically limited to RNC. The RNC can also set the maximum SIR target for a given radio access bearer, which may have to be set to a high value to support the peak rate, since required SIR target typically increases with increased rate when a certain target number of re-transmissions is targeted.

The inner loop power control is performed at the RBS to control the power of each of its instances of user equipment. One task in the inner loop power control is to measure the SIR for each user equipment at the RBS and control the transmission power of the respective instances of user equipment to reach the SIR target received from the outer loop control.

The RBS, and more specifically the scheduler 14 (FIG. 2) is in control of the granted rate in uplink for instances of user equipment within the cell for the RBS.

As described herein, one or more embodiments limit the maximum SIR target for instances of user equipment per granted UL (uplink) rate, to thereby control the load on the radio link. In embodiments described herein, the outer loop power control is limited to a maximum SIR target, typically for each cell, depending on granted data rate and/or the number of instances of user equipment. This limitation can be calculated at the RNC or RBS and is applied at the RBS.

One consequence of limiting the maximum SIR target relative to the SIR target operating point for a given HARQ BLER, is that the number of HARQ re-transmissions for a particular granted rate is affected. A lower maximum SIR target below the operating SIR of the connection results in a higher number of HARQ re-transmissions. A higher maximum SIR target that is above the operating SIR of the connection, means that the number of HARQ re-transmissions is controlled by the outer loop power control, i.e. not limited necessarily by the value of Maximum SIR target The ability to limit the SIR target per granted rate thus gives at least two significant advantages. Firstly, the network operator can trade off air interface capacity vs. hardware required for particular rates (since both are dependent on number of HARQ transmissions). Secondly, fluctuations in SIR target are reduced, resulting in a more stable system with higher cell capacity.

Lower maximum SIR compared to the operating SIR required for a certain percentage of re-transmissions, leads to higher number of HARQ re-transmissions, and (to a certain point) better EUL cell capacity. Gains of up to 90% cell capacity have been shown in tests.

Higher maximum SIR target compared to the operating SIR required for a certain percentage of re-transmissions, leads to lower number of HARQ re-transmissions, and better desired rate is achieved. So a high maximum SIR target can be set to achieve a peak rate when there is a need for a low target BLER.

Moreover, the more stable the SIR target is achieved with multiple users, the better air interface load control behaves. Stable air interface load leads to fewer absolute grant fluctuations and an increase in capacity for the same Rise over Thermal noise target.

It is to be noted that more HARQ re-transmissions require more HW processing for the same rate. For example, a 500 kbps rate with a target of 1 HARQ transmission means the hardware needs to decode the corresponding E-TFCI (EUL Transport Format Combination Identifier) to a rate of 500 kbps. On the other hand, a 500 kbps rate with target 2 HARQ transmissions means the hardware needs to decode the corresponding E-TFCI to a rate of 1000 kbps.

By giving the operator the ability to configure maximum SIR target for a given granted rate, the operator can control the trade-off between air-interface capacity gain and HW usage, depending on the amount of licensed hardware that they have available. This is a flexible solution for operators, where greater hardware requirements are associated with greater costs.

The SIR target needed for a certain rate with a certain amount of HARQ re-transmissions depends on the radio channel. An operator can tune the maximum SIR target per rate per RBS or per cell to achieve suitable performance for their own networks radio conditions.

Figures 4, 5A:
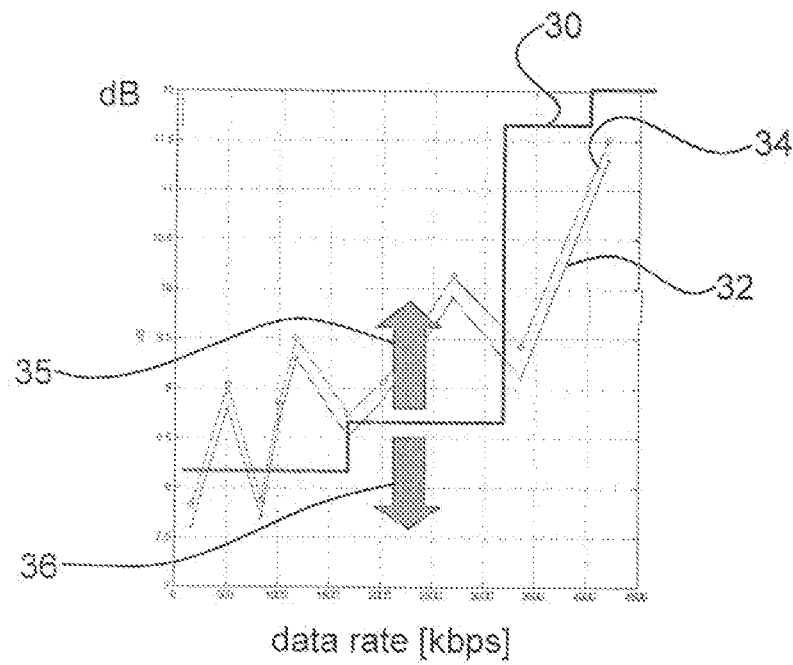
FIG. 4 is a schematic graph illustrating how the SIR can be controlled depending on data rate in an embodiment of the environment illustrated in FIG. 1.
FIG. 5a is a table illustrating how the maximum SIR target can be configured depending on the data rate when the transmission time interval is 2 ms.

Observing now FIG. 4, this a schematic graph illustrating how the SIR can be controlled for a radio cell depending on data rate in an embodiment of the environment illustrated in FIG. 1. The horizontal axis represents data rate in kbps and the vertical axis represents decibel (dB). A lower jagged line 32 represents median SIR target, as commanded by the RNC, as is known per se, and a higher jagged line 34 represents actual median SIR. The thick line 30 represents configured maximum SIR target.

The arrows 35, 36 illustrate the ability of the network operator to reduce 36 or increase 35 the maximum SIR target of the user equipment of the cell to balance air interface capacity versus hardware requirements. Moreover, the maximum SIR target can be configured independently for different data rates.

In the example shown, the maximum SIR target line 30 limits the target SIR target for data rates less than 3200 kbps, with a couple of small exceptions. In other words, the user equipment of the cell in question receives commands to adjust its power such that the SIR measured in the RBS the lower of the median SIR target 32 and the maximum SIR target 30 is not exceeded.

FIG. 5a is a table 39a illustrating the configuration of maximum SIR target to be used when the transmission time interval is 2 ms. This table is a look-up table with a column 38 for TTI and a column 40 for granted rate. Using the columns 38, 40 for TTI and granted rate, a value for Max SIR target is read in column 42. The TTI column 38 has the unit of ms, the data rate column 40 has the unit of Mbps and the maximum SIR target column has the unit of dB. The look-up table 39a is thus used by the RBS 2, 2a, 2b to determine the maximum SIR target based on data rate.

Figures 5B, 6:
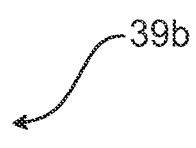
FIG. 5b is a table illustrating how the maximum SIR target can be configured depending on the data rate when the transmission time interval is 10 ms.
FIG. 6 is a table illustrating how the maximum SIR target can be configured depending on the number of users in a cell.

FIG. 5b is a table 39b illustrating the configuration of maximum SIR target to be used when the transmission time interval is 10 ms. The table here 39b has the same structure as the table 39a of FIG. 5a, but relates to a TTI of 10 ms. The look-up table 39b is used by the RBS 2a, 2b to determine the maximum SIR target based on data rate. The two tables 39a, 39b can be separate or can be combined in a single table.

FIG. 6 is a table illustrating how the maximum SIR target can be configured depending on the number of users in a cell. The first column 44 indicates the number of users and the second column indicates the maximum SIR target. The table can be used by the RBS 2a, 2b or the RNC 6 to determine the maximum SIR target based on number of active users in a cell.

Figure 7:
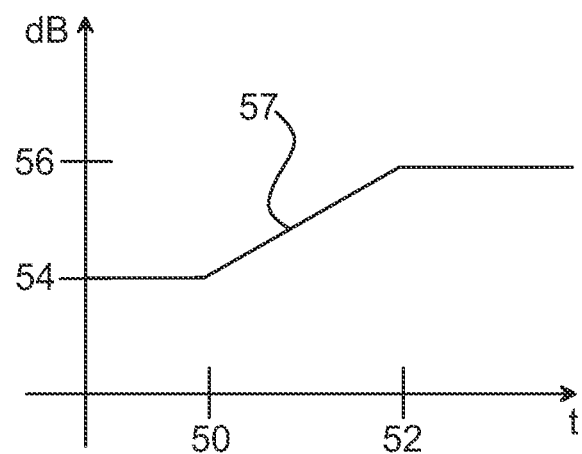
FIG. 7 is a schematic graph illustrating the use of a ramp function to shift to a newly determined maximum SIR.

FIG. 7 is a schematic graph illustrating the use of a ramp function 57 to shift to a newly determined maximum SIR. The ramp function determines a rate of change that is allowed when a maximum SIR target is changed from a first value 54 to a second value 56 for a user equipment. The ramp function commands that the change from the first value 54 to the second value 56 is to be effected gradually in a duration from a first point in time 50 to a second point in time 52.

Figure 8:
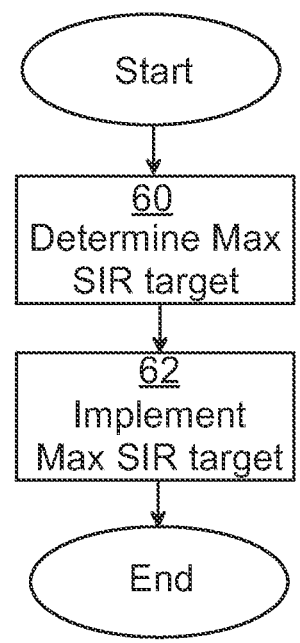
FIG. 8 is a flow chart illustrating a method according to embodiments described herein, and FIG. 9 schematically shows one example of a computer program product comprising computer readable means.

FIG. 8 is a flow chart illustrating a method according to embodiments described herein. The method can be executed in a radio base station 2a, 2b or in a radio network controller 6.

In a first step 60, the maximum SIR target is determined. The maximum SIR target is determined per cell or per RBS.

In a second step 62, the determined maximum SIR target is implemented using inner loop power control such that the maximum SIR target determined from the previous step is not exceeded. This can be done by sending a message comprising the maximum SIR ratio to each one of the instances of user equipment to thereby limits maximum transmission power of the at least one user equipment.

Now it will be explained in some more detail a first embodiment where the maximum SIR target is controlled from the RBS.

Configure a table of the Maximum SIR target allowed for each granted rate k, denoted Max_SIRtarget_Grant$_K$, e.g the tables 39a, 39b of FIGS. 5a, 5b. Separate tables are possible for 2 ms TTI, 10 ms TTI, and also for different Enhanced Uplink RAB (Radio Access Bearer) combinations, for example standalone PS (packet switched) interactive on EUL, Speech+Eul etc.

The SIR target used for Inner loop power control at any given instance is given by the function:

$$\text{SIR\_target}_{ILPC} = \text{Min}(\text{SIR\_target}_{OLPC}, \text{Max\_SIRtarget\_Grant}_x)$$

Where SIR_target$_{OLPC}$ is the current SIR target provided from the Outer-Loop Power Control in the RNC, or in future in the RBS.

Depending on how the operator sets the Max_SIRtarget_Grant$_K$, it may be that SIR_target$_{OLPC}$ is always greater than Max_SIRtarget_Grant$_K$ for example if OLPC is trying to achieve a HARQ BLER that is much lower than the HARQ BLER that results from low settings of Max_SIRtarget_Grant$_K$. In this situation the OLPC in the RNC will raise the SIR target to its own configured maximum SIR target value.

As a result it may be that the SIR target per granted rate is effectively controlled by Max_SIRtarget_Grant$_K$. This could lead to large jumps in actual SIR target, when changing a users granted rate, depending on how the operator has configured the table.

To avoid that there is too large an instantaneous change in SIR target (which could lead to a power rush) a ramping function, e.g. function 57 of FIG. 7, of SIR target can be added based on the delta between the current SIR_target$_{ILPC}$ and the wanted SIR target that is the output of the function Min (SIR_target$_{OLPC}$, Max_SIRtarget_Grant$_K$), i.e. the rate of change of SIR target that is allowed to get to the wanted SIR target can be slowed. For example maximum rate of change of SIR target is x dB every y ms.

In an extension of this embodiment the configured maximum SIR target can also be made a function of the number of users in the cell, or a function of the available hardware in the cell. For example if there are no hardware limitations the Maximum SIR target could be set low to optimize radio interface capacity. If the hardware is limited in the cell, then it may be required to grant rates that utilize the hardware as efficiently as possible, for example with low HARQ BLER The maximum SIR target per granted rate may be controlled either per RBS or per cell in the RBS. In an initial implementation it is envisaged that a per RBS configuration would be used, however a per cell configuration is not excluded.

With a cell based solution a user equipment in softer handover will need to select a specific SIR target to use in ILPC. This can be achieved by extending the expression above slightly:

$$\text{SIR\_target}_{ILPC} = \text{Min}(\text{SIR\_target}_{OLPC}, \text{Max\_SIRtarget\_Grant}_{K,i})$$

Where the index i runs over all cells currently included in the active set.

Now it will be explained in some more detail a second embodiment where the maximum SIR target is controlled from the RNC.

A table of the Maximum SIR target allowed depending on the number of users in the cell is configured.

For example if there is a single 2 ms user in cell then high maximum SIR target may be allowed to reach the peak rate.

If there are many EUL users in the cell, then the maximum SIR target can be limited for the same reasons described earlier.

Separate tables are possible for 2 ms TTI and 10 ms TTI, and if required for different RAB combinations. For example standalone PS interactive EEL or Speech and EUL.

The RNC updates the RBS with maximum SIR target for use in inner loop power control as number of users and received rate changes.

Figure 9:
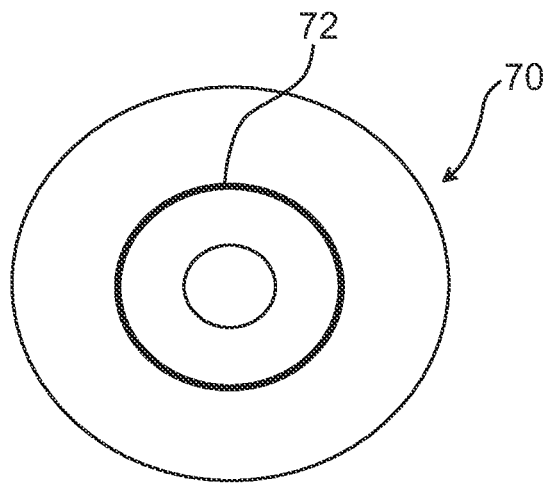

FIG. 9 schematically shows one example of a computer program product 70 comprising computer readable means 72. On this computer readable means 72, a computer program can be stored, which computer program can cause a computer to execute the method according to embodiments described herein. In this example, the computer program product is an optical disc, such as a CD (compact disc), a DVD (digital versatile disc) or a blu-ray disc. The computer readable means can also be solid state memory, such as flash memory or a software package distributed over a network, such as the Internet.

It is to be noted that the maximum SIR targets determined as described herein can be DPCCH SIR targets, e.g. in an EUL system.

The invention has mainly been described above with reference to a few embodiments. However, as is readily appreciated by a person skilled in the art, other embodiments than the ones disclosed above are equally possible within the scope of the invention, as defined by the appended patent claims. In particular, the numerical values provided are only examples and the skilled person will realise that the invention can be applied with other numerical values.

The invention claimed is:

1. A power controller for a fixed node in a cellular network that is responsible for one or more user equipments in one or more cells of the cellular network, the power controller comprising a signal to interference ratio (SIR) determiner configured to determine a maximum SIR target for each user equipment based directly or indirectly on the number of user equipments in the same cell as that user equipment, the maximum SIR target limiting the maximum transmission power of the user equipment.

2. The power controller according to claim 1, wherein the SIR determiner is configured to determine a relatively higher maximum SIR target for a user equipment if the number of user equipments in the same cell as that user equipment decreases.

3. The power controller according to claim 1, wherein the determiner is configured to determine a maximum SIR target for each user equipment based on a data rate granted to that user equipment.

4. The power controller according to claim 3, wherein the determiner is configured to determine a relatively higher maximum SIR target for a user equipment if the data rate granted to that user equipment increases.

5. The power controller according to claim 1, wherein the determiner is configured to determine a maximum SIR target for each user equipment based on a data rate granted to that user equipment and a transmission time interval for the user equipment.

6. The power controller according to claim 1, wherein the determiner is configured to determine the maximum SIR target for each user equipment using a lookup table.

7. The power controller according to claim 1, wherein the power controller is configured to direct a user equipment to shift its maximum SIR target to the maximum SIR target determined for that user equipment using a ramp function.

8. The power controller according to claim 1, wherein the determiner is configured to determine the maximum SIR target for each user equipment as the minimum of:
a maximum SIR target received from a more central network node, and
the maximum SIR target previously determined for the user equipment by the power controller.

9. The power controller according to claim 1, wherein the determiner is configured to determine the maximum SIR target for each user equipment based on the number of user equipments that are active in the same cell as that user equipment.

10. The power controller according to claim 1, wherein the determiner is configured to determine the maximum SIR target for each user equipment based on the number of user equipments that are active with enhanced uplink in the same cell as that user equipment.

11. The power controller according to claim 1, wherein the power controller is configured to limit the maximum transmission power of a user equipment only for best effort data transmission.

12. The power controller according to claim 1, further configured to send a message comprising the maximum SIR target determined for each user equipment to that user equipment.

13. A base station responsible for one or more user equipments in one or more cells of a cellular network, the base station including a power controller, the power controller comprising a signal to interference ratio (SIR) determiner configured to determine a maximum SIR target for each user equipment based directly or indirectly on the number of user equipments in the same cell as that user equipment, the maximum SIR target limiting the maximum transmission power of the user equipment.

14. A radio network controller configured to manage a plurality of base stations responsible for one or more user equipments in one or more cells of a cellular network, wherein the radio network controller includes a power controller, the power controller comprising a signal to interference ratio (SIR) determiner configured to determine a maximum SIR target for each user equipment based directly or indirectly on the number of user equipments in the same cell as that user equipment, the maximum SIR target limiting the maximum transmission power of the user equipment.

15. A method implemented by a power controller configured for use in a fixed node responsible for one or more user equipments in one or more cells of a cellular network, the method comprising:
determining a maximum signal to interference ratio (SIR) target for each user equipment based directly or indirectly on the number of user equipments in the same cell as that user equipment; and
sending a message comprising the maximum SIR target determined for each user equipment to that user equipment, to thereby limit the maximum transmission power of the user equipment.

16. The method according to claim 15, wherein said determining comprises determining a relatively higher maximum SIR target for a user equipment if the number of user equipments in the same cell as that user equipment decreases.

17. The method according to claim 15, wherein said determining comprises determining a maximum SIR target for each user equipment based on a data rate granted to that user equipment.

18. The method according to claim 17, wherein said determining comprises determining a relatively higher maximum SIR target for a user equipment if the data rate granted to that user equipment increases.

19. The method according to claim 15, wherein said determining comprises determining a maximum SIR target for each user equipment based on a data rate granted to that user equipment and a transmission time interval for the user equipment.

20. A computer program product stored on a non-transitory computer readable medium and comprising computer program code which, when run on a power controller configured for use in a fixed node responsible for one or more user equipments in one or more cells of a cellular network, causes the power controller to:
determine a maximum signal to interference ratio (SIR) target for each user equipment based directly or indirectly on the number of user equipments in the same cell as that user equipment; and
send a message comprising the maximum SIR target determined for each user equipment to that user equipment, to thereby limit the maximum transmission power of the user equipment.

21. The power controller according to claim 1, wherein the power controller is configured to determine the maximum SIR target by setting a value for the maximum SIR target.

22. The power controller according to claim 1, wherein the power controller is configured to determine the maximum SIR target for each user equipment based directly on the number of user equipments in the same cell as that user equipment.

23. The power controller according to claim 1, wherein the maximum SIR target is determined to be the same for each user equipment that is in the same cell and that is granted the same data rate.

24. The power controller according to claim 1, wherein the power controller is configured to determine an SIR target for inner loop power control as a minimum of an SIR target from outer loop power control and the maximum SIR target.

* * * * *

UNITED STATES PATENT AND TRADEMARK OFFICE
CERTIFICATE OF CORRECTION

PATENT NO.          : 8,655,399 B2                                         Page 1 of 1
APPLICATION NO.     : 13/123751
DATED               : February 18, 2014
INVENTOR(S)         : Wong et al.

It is certified that error appears in the above-identified patent and that said Letters Patent is hereby corrected as shown below:

In the Specification

In Column 7, Lines 58-59,
delete "SIR_target$_{ILPC}$–Min(SIR_target$_{OLPC}$,MaxSIRtarget_Grant$_x$)" and
insert -- $SIR\_target_{ILPC} = Min (SIR\_target_{OLPC}, Max\_SIRtarget\_Grant_K)$ --, therefor.

Signed and Sealed this
Second Day of September, 2014

Michelle K. Lee
*Deputy Director of the United States Patent and Trademark Office*